United States Patent [19]

Kobylarz et al.

[11] Patent Number: 5,010,570
[45] Date of Patent: Apr. 23, 1991

[54] METHOD FOR ACTIVE FEEDBACK SUPPRESSION

[75] Inventors: Daniel E. Kobylarz, Burnsville, Minn.; David K. Ford, Mesa, Ariz.

[73] Assignee: Motorola, Inc., Schaumburg, Ill.

[21] Appl. No.: 481,531

[22] Filed: Feb. 20, 1990

[51] Int. Cl.$^5$ ............................................. H04M 9/08
[52] U.S. Cl. ................................... 379/390; 379/406; 379/388
[58] Field of Search ................. 379/58, 388, 390, 406, 379/409, 389; 381/93, 96, 76

[56] References Cited

U.S. PATENT DOCUMENTS

| | | | |
|---|---|---|---|
| 3,975,588 | 8/1976 | Besseyre et al. | 379/390 |
| 4,571,461 | 2/1986 | Uno et al. | 379/390 |
| 4,629,829 | 12/1986 | Puhl et al. | 379/390 X |
| 4,715,063 | 12/1987 | Haddad et al. | 379/390 |
| 4,741,018 | 4/1988 | Potratz | 379/58 |
| 4,764,954 | 8/1988 | Tsurusaki et al. | 379/390 |
| 4,843,621 | 6/1989 | Potratz | 379/58 |
| 4,879,745 | 11/1989 | Arbel | 379/390 |
| 4,955,055 | 9/1990 | Fujisaki et al. | 379/390 |

*Primary Examiner*—James L. Dwyer
*Assistant Examiner*—M. Shehata
*Attorney, Agent, or Firm*—Kenneth W. Bolvin

[57] ABSTRACT

A process to reduce the howl condition in a radiotelephone when the microphone picks up audio from the speaker. The condition is detected by first lowering the speaker volume (103) and measuring the microphone volume for a corresponding decrease (104). The speaker volume is then increased (105) and the microphone volume is again measured for a corresponding increase (106). If the microphone volume follows the speaker volume, a howl condition has been detected. To eliminate the condition without the volume fluctuations being noticed by the parties conversing, the microphone and speaker volume is reduced in small increments (114) until the condition is eliminated.

13 Claims, 2 Drawing Sheets

METHOD FOR ACTIVE FEEDBACK SUPPRESSION

FIELD OF THE INVENTION

This invention relates generally to the communications field and particularly to the radiotelephone communications field.

BACKGROUND OF THE INVENTION

In both radio and landline telephone systems, a user communicates by means of a handset that includes a speaker at one end that is placed close to the user's ear and a microphone at the other end that is held close to the user's mouth. This placement ensures that the audio from the speaker does not reach the microphone causing feedback problems. If the handset is taken away from the face, however, the speaker audio has a free path to the microphone. This is especially true when the handset is placed facedown on a surface. The surface acts as a reflector, reflecting the audio from the speaker to the microphone.

Government regulations restrict the amount of speaker audio to microphone coupling. Many countries have this type of regulation due to their cellular radiotelephone systems producing high sidetone levels. The higher sidetone levels would produce an irritating feedback howl if the speaker audio is coupled to the microphone.

One approach to solving this problem is a mechanical fix. The microphone is surrounded by a rubber ring that, when the handset is placed on a surface, seals the microphone from the speaker audio, thereby reducing speaker to microphone coupling.

This approach, however, creates its own problems. The mechanical designer must incorporate the rubber ring into the handset's design, limiting the designer to certain designs. Also, the rubber ring does not always seal correctly, allowing the speaker audio to reach the microphone. In addition, the rubber ring does not prevent feedback between the time the handset is lifted from the surface and brought to the user's face. Accordingly, there is a need for an improved method of suppressing feedback in radiotelephone equipment.

SUMMARY OF THE INVENTION

The present invention provides a process for actively suppressing feedback in a radiotelephone device. The process consists of comparing the user volume, which is equal to microphone volume plus speaker volume, to the system loop gain stored in memory in the radiotelephone. If the user volume is greater than the system loop gain, the speaker volume is reduced. If the microphone volume did not decrease a corresponding amount, the speaker volume is increased by the amount it was reduced, and the user volume is again compared to the system loop gain. If the microphone volume decreased a corresponding amount, the speaker volume is increased the amount it was reduced and the microphone volume is checked for a corresponding increase. If the microphone volume does not increase the corresponding amount, the process starts over from the beginning. If the microphone volume does increase, the user volume is decreased by smaller steps until the volume is below the howl threshold. The user volume is then increased in the same small steps until the volume is nominal and also below the howl threshold.

In the preferred embodiment, the initial decreasing of the speaker volume is done in 5 decibel (dB) steps. Once it is determined that there is a feedback problem by the corresponding increase and decrease of the microphone volume, the user volume is returned to normal volume, but less than a howl condition, in 0.60 dB steps. The smaller steps ensures that the user will not notice the volume change if a conversation is taking place while the volume gain is changed.

DETAILED DESCRIPTION OF THE PREFERRED EMBODIMENT

The process of active feedback suppression in a radiotelephone, according to the present invention, continuously monitors the amount of feedback occurring between the speaker and microphone. If there is enough feedback to create an irritating howl condition, the microphone and speaker volumes are reduced until the condition is eliminated.

Figure 1A:
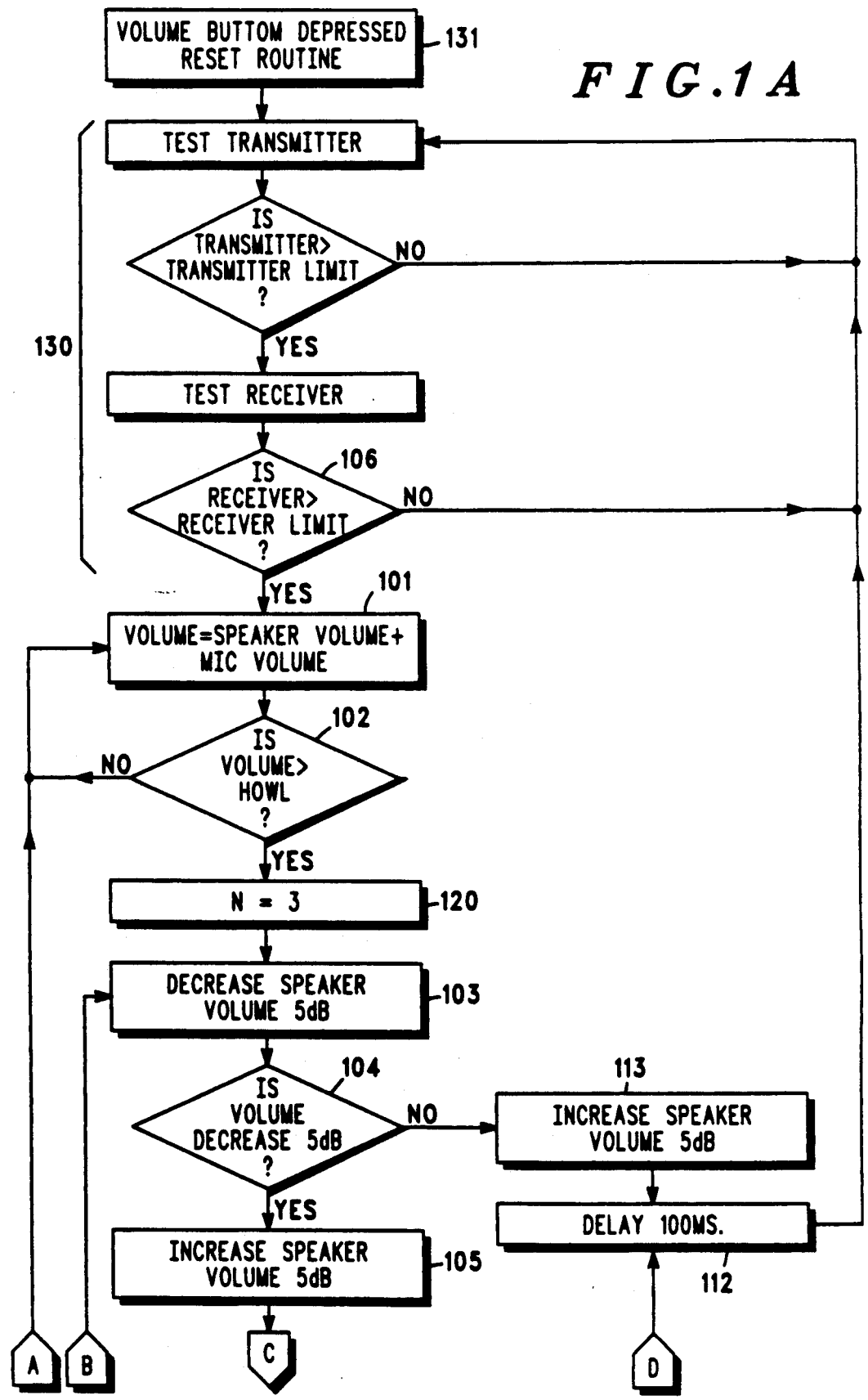
FIGS. 1A and 1B shows a flow chart illustrating the process for active feedback suppression.
Figure 1B:
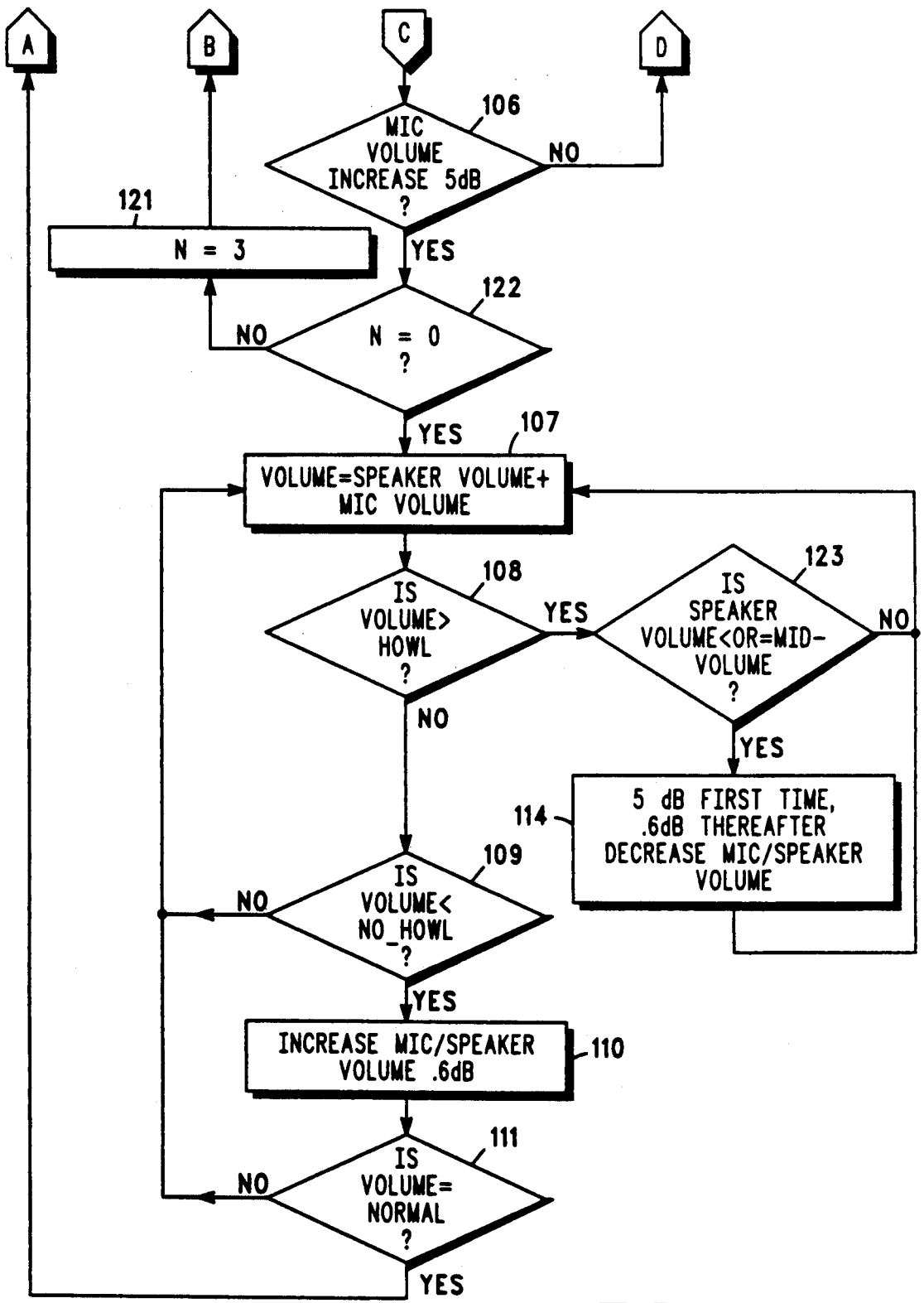

The process, illustrated in FIG. 1A and 1B, begins with determining if a howl condition exists. In order for a howl condition to be present, a signal must be transmitted or received by the radiotelephone and cause excessive feedback between the speaker and the microphone. High ambient noise picked up by the radiotelephone, however, can fool the routine into detecting feedback. Without safeguards, feedback suppression will cause the volume to decrease even though a howl condition does not exist. The safeguards include testing the transmit and receive audio levels to determine if howl suppression is needed (130). If either the transmit or receive audio levels are below the audio levels of normal speech, howl suppression is not required since what was detected as a howl condition is actually ambient noise and not a signal being transmitted or received. If the transmit and receive audio levels are greater than the level of speech, a howl condition may exist since a signal is being transmitted or received.

Once it is determined that a howl condition may exist, a system loop gain limit that has been calculated for each radiotelephone system is stored in the radiotelephone's memory as the howl limit. The radiotelephone's user volume (101), also called the measured loop gain, is equal to the speaker volume plus the microphone volume. This value is compared to the howl limit (102). If the user volume is greater than this limit, a potentially unstable condition, and therefore a howl condition, exists. If this condition arises, it must be determined if this potential for instability is caused by the microphone picking up speaker audio or if a dual conversation (both parties talking at the same time) is taking place and causing a high gain situation.

To determine the cause of the potential instability, the speaker volume is decreased 5 decibels (dB) (103) for 20 milliseconds. If the microphone volume does not decrease a corresponding 5 dB (104), a dual conversation is assumed and the speaker volume is increased 5 dB (113). Further testing for a howl condition is performed at a subaudible rate by delaying the testing by 100 milliseconds (112). This rate ensures that the parties conducting the conversation do not experience audible distortion due to the speaker volume being reduced and increased. Testing execution remains at this rate until a howl condition is detected or the measured loop gain falls below the howl limit. In either case, the speaker/microphone audio coupling no longer needs to be tested and execution can return to normal speed.

If the microphone volume decreases a corresponding 5 dB with the speaker volume, the speaker volume is increased 5 dB (105) and measurement of the microphone volume is repeated a second time (106). If the microphone does not follow the speaker volume increase, a dual conversation is again assumed and the above procedure for subsequent testing is followed. If the microphone volume increases a corresponding 5 dB, the speaker audio is being picked up by the microphone and causing the feedback howl condition. The above steps (103–106) are repeated three times in the preferred embodiment by setting a software variable to three (120) and decrementing it by one (121) for each pass. The variable is checked (122) after each pass. Other embodiments could perform these steps (103–106) only once or repeat them any number of times.

When a howl condition is detected, the microphone and speaker audio must be reduced until the howl is no longer present. The reduction must remain unnoticeable to the parties if a conversation is taking place but must also be done quickly to remove the howl. This is accomplished by first reducing the microphone audio by five dB and then reducing it in 0.60 dB steps (114) until the howl condition is eliminated or the mid-range of the volume is reached (123). If the volume is reduced below mid-range, normal conversation could be affected and therefore mid-range is set as the lower limit of volume reduction.

Once the howl condition is removed, the volume is slowly increased (110) to as close to normal volume as possible without causing the howl to return. This is accomplished by performing steps 107–111 and 114 repeatedly.

The howl suppression routine can be reset by pushing the radiotelephone's volume button (131) if the routine is fooled into detecting a howl condition by high ambient noise on one side of the conversation. By pushing the volume button to increase the volume, the routine realizes that the radiotelephone is being used and a howl condition does not exist. This will keep the routine from trying to reduce the volume again.

A process to suppress feedback in a radiotelephone has been shown. This process will be executed by the radiotelephone's microprocessor as often as possible providing continuous suppression of the feedback howl condition caused by the microphone picking up the speaker audio. By implementing this process in a radiotelephone, mechanical procedures for suppressing feedback are no longer need, providing greater freedom in designing radiotelephone housings.

We claim:

1. A method for actively suppressing feedback in a communications device having a system loop gain, a received audio signal, a transmit audio signal, and a user volume equal to a speaker volume plus a microphone volume, the steps comprising:
   (A) if the user volume is less than the system loop gain, repeating from step A;
   (B) decreasing the speaker volume by a first predetermined amount and if the microphone volume does not decrease by the first predetermined amount, increasing the speaker volume by the first predetermined amount, delaying for a predetermined time and repeating from step A;
   (C) increasing the speaker volume by the first predetermined amount;
   (D) delaying for the predetermined time and repeating from step A if the microphone volume does not increase by the first predetermined amount;
   (E) decreasing the microphone volume and the speaker volume by a second predetermined amount until the user volume is less than the system loop gain;
   (F) increasing the microphone volume and the speaker volume by the second predetermined amount and if the user volume is not nominal, repeating from step E; and
   (G) repeating from step A.

2. The method of claim 1 wherein the first predetermined amount of steps B–D is 5 decibels.

3. The method of claim 1 wherein the predetermined time of steps B and D is 100 milliseconds.

4. The method of claim 1 wherein the second predetermined amount of steps E and F is 0.60 decibels.

5. The method of claim 1 and further including the steps of checking the transmit audio signal and the receive audio signal, if either the transmit audio signal or the receive audio signal is greater than a nominal audio level, performing from step A.

6. The method of claim 1 wherein the nominal volume of step G is an audio level within the range of human hearing.

7. A method for actively suppressing feedback in a communications device having a system loop gain stored in memory, a received audio signal, a transmitted audio signal, and a user volume substantially equal to a speaker volume plus a microphone volume, the steps comprising:
   (A) comparing the transmitted audio signal to a first predetermined limit;
   (B) comparing the received audio signal to a second predetermined limit if the transmitted audio signal is less than the first predetermined limit;
   (C) repeating from step A if the received audio signal is less than the second predetermined limit;
   (D) decreasing the speaker volume by a first predetermined amount if the user volume is greater than the system loop gain;
   (E) delaying for a predetermined time and repeating from step A if the microphone volume does not decrease by the first predetermined amount, increasing the speaker volume by the first predetermined amount;
   (F) increasing the speaker volume by the first predetermined amount;
   (G) delaying for the predetermined time and repeating from step A if the microphone volume does not increase by the first predetermined amount;
   (H) repeating steps D–G a predetermined number of times;
   (I) decreasing the microphone volume and the speaker volume by a second predetermined amount until the user volume is less than the system loop gain stored in memory and greater than or equal to a mid-range of the speaker volume;
   (J) increasing the microphone volume and the speaker volume by the second predetermined amount until the user volume within a range bounded by the system loop gain as a lower limit and nominal volume as an upper limit; and
   (K) repeating from step A.

8. The method of claim 6 wherein the first predetermined amount in steps D-G is 5 decibels.

9. The method of claim 6 wherein the predetermined time in steps E and G is 100 milliseconds.

10. The method of claim 6 wherein the second predetermined amount in steps I and J is 0.60 decibels.

11. The method of claim 6 wherein the microphone volume and the speaker volume of step H is decreased 5 decibels a first time and 0.6 decibels each succeeding time.

12. The method claim 6 wherein the first and second predetermined limits of steps A-C are audio levels considered nominal for the communications device.

13. A method for actively suppressing feedback in a radiotelephone device having a microphone, a speaker, a system loop gain stored in memory, and a user volume substantially equal to a speaker volume plus a microphone volume, the steps comprising:
- (A) decreasing the speaker volume by a first predetermined amount and checking for a corresponding decrease in the microphone volume if the user volume is greater than the system loop gain stored in memory;
- (B) waiting a predetermined time and repeating from step A if the microphone volume did not decrease the first predetermined amount, increasing the speaker volume by the first predetermined amount;
- (C) decreasing the microphone volume and the speaker volume until the user volume is less than the system loop gain stored in memory;
- (D) increasing the user volume until a nominal volume is reached; and
- (E) repeating from step A.

* * * * *

UNITED STATES PATENT AND TRADEMARK OFFICE
CERTIFICATE OF CORRECTION

PATENT NO. : 5,010,570

DATED : April 23, 1991

INVENTOR(S) : Daniel E. Kobylarz Et Al.

It is certified that error appears in the above-identified patent and that said Letters Patent is hereby corrected as shown below:

In the Drawings

In FIG 1B, block 121, please change "N=3" to --N=N-1--.

In Column 5, lines 1, 3, 5, 7 and 11 please change "claim 6" to --claim 7--.

Signed and Sealed this

Fifteenth Day of December, 1992

*Attest:*

DOUGLAS B. COMER

*Attesting Officer*   Acting Commissioner of Patents and Trademarks